Dec. 8, 1931.    A. C. HUSTON    1,835,398
PAPER TUBE CUTTER
Filed Sept. 23, 1929
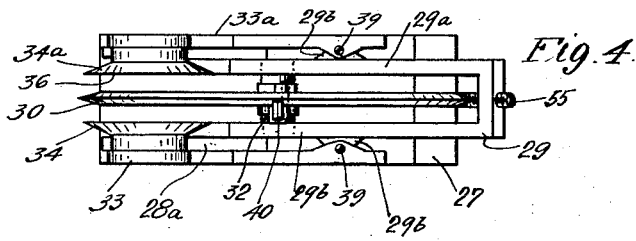
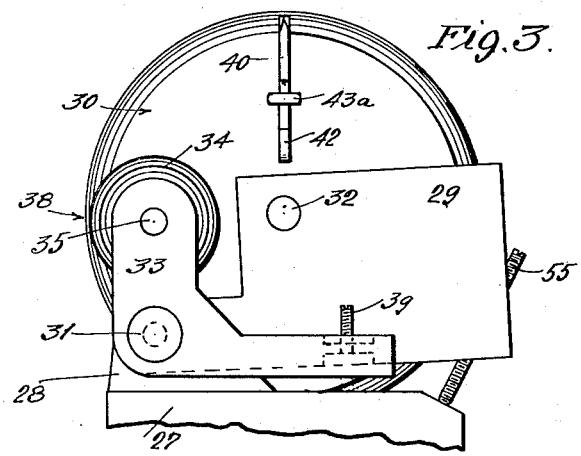
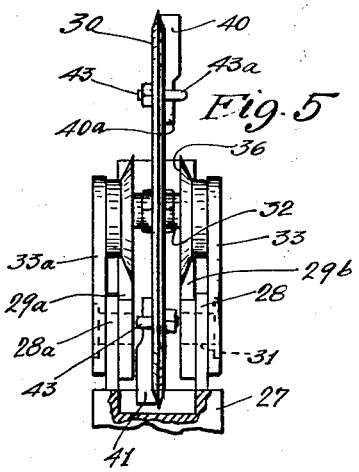
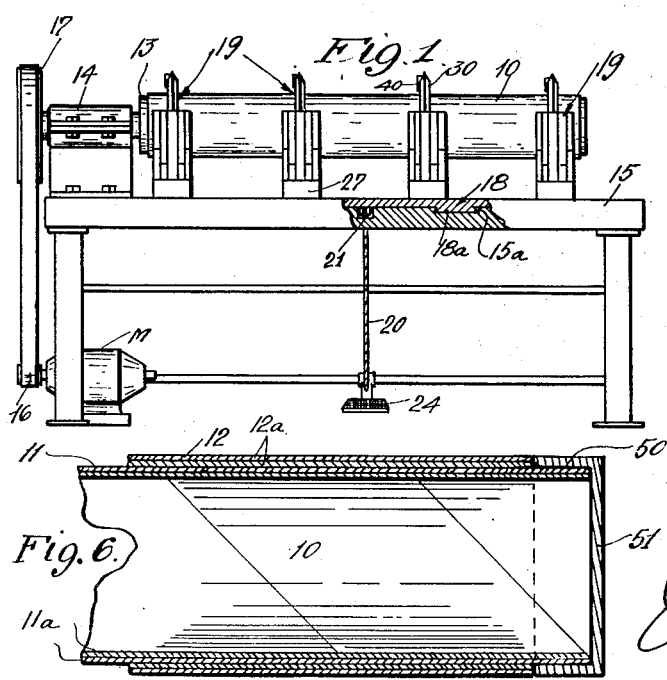
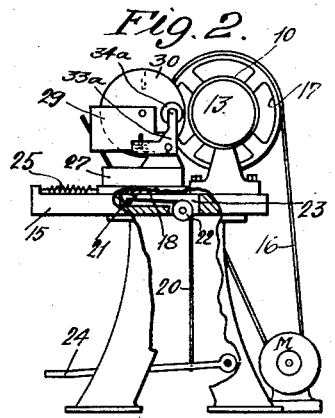
Inventor
Arch. C. Huston
Attorney.

Patented Dec. 8, 1931

1,835,398

UNITED STATES PATENT OFFICE

ARCH C. HUSTON, OF LOS ANGELES, CALIFORNIA

PAPER TUBE CUTTER

Application filed September 23, 1929. Serial No. 394,453.

This invention has reference to devices for cutting paper tubes and relates particularly to a disk type cutter for use in the manufacture of capped paper containers or cans from spirally wound tubular stock.

The purpose of the invention will be more clearly understood after a brief description of the nature of the spirally wound stock from which the can bodies are produced, and the manner in which the stock is cut in order to enable the end caps to be fitted thereon. The tubular stock may be considered as being formed in two layers, each of which may consist of one or more spirally wound plies glued together, no adhesive however being applied between the layers proper so as to enable segments of the outer layer to be readily stripped from the inner. In the operation of forming the container bodies from the stock made up in this manner, the tube is severed through both layers into suitable lengths in accordance with the size of container desired, and each length cut annularly near each end through the outer layer only, the severed end portions of the latter being stripped from the inner layer to enable cup-shaped caps to be fitted thereon.

It is a purpose of the invention to provide a form of cutter whereby the tube stock may in a single operation be severed into the desired lengths and the end portions of the outer layer of each length stripped from the inner layer to accommodate the caps. For this purpose I employ a plurality of alined cutter assemblies each comprising a pair, and preferably three parallel and rotatable disk cutters preferably though not necessarily arranged side by side and adapted to be brought into engagement with the tube, the latter being rotated on a mandrel during the cutting operation. The cutters of each assembly are relatively arranged in such positions that the intermediate cutter is moved through the tube wall to the point of engagement with the mandrel, thereby severing the tube, the other cutters on each side of the tube severing cutter traversing the tube wall only substantially through its outer layer. In order to accomplish removal of the severed sections of the outer layer between the cutters, lateral stripper blades are mounted on the side of the intermediate cutter disk, the cutting end of each blade being spaced from the periphery of the attached cutter disk a distance corresponding substantially to the thickness of the inner tube layer. As the blade carrying cutter disk is brought into engagement with the tube or mandrel and rotated by virtue of its engagement therewith, the lateral blades, at one point during the revolution of the tube severing cutter, split the outer tube layer longitudinally between the cutters. Thus as the severed sections are removed from the mandrel, the split end segments of the outer layer readily fall away.

The above and additional details of the invention will be understood most readily and clearly from the following detailed description of a typical and preferred embodiment thereof, reference being had throughout the description to the accompanying drawings, in which:

Fig. 1 is a front elevation of a typical form of tube cutting mechanism embodying cutters of the type comprising the invention;

Fig. 2 is an end elevation of Fig. 1 as viewed from the right thereof, a portion of the table and carriage being broken away to show the construction more clearly;

Fig. 3 is a fragmentary view showing an enlarged side elevation of one of the cutter assemblies;

Fig. 4 is a plan view of Fig. 3;

Fig. 5 is an end elevation of Fig. 3 as viewed from the left thereof; and

Fig. 6 is a sectional view through a typical form of spirally wound tubular stock of layer formation such as to enable it to be cut at the ends to accommodate caps.

Referring first to Fig. 6, the tubular stock 10 from which the can bodies are cut, is shown to be formed in two separate layers 11 and 12, each comprising in the particular stock illustrated, two spirally wound piles 11a and 12a respectively. In the operation of forming the tube, the respective plies of the inner and outer layers are glued together, no adhesive however being applied between the layers to enable annularly cut sections of the outer layer to be radially stripped from the inner layer as will later be described. It may be mentioned that the particular manner in which the paper tube stock is made up as illustrated is typical only, and that the tube may be formed in two or more layers each of any desired thickness and of any number of plies and of any form of construction. The machine shown in Figs. 1 and 2, by means of which the carton bodies are cut from the tube stock, embodies a rotatable cylindrical mandrel 13 upon which the tube 10 is placed for cutting, the mandrel being journaled in the bearing support 14 at one of the table 15. The mandrel is rotated during operations by the motor M by way of belt 16 and the mandrel pulley 17. Mounted on the table 15 is a laterally reciprocable carriage 18 which is guided in its reciprocating movement by splines 18a on its under side working within grooves 15a in the table. A suitable number of alined cutter assemblies generally indicated at 19 are mounted on the carriage, the cutter assemblies being spaced in accordance with the desired length of carton to be cut from the stock. As a typical means for actuating the carriage in its reciprocating movement there is shown a cable 20 attached at 21 to the under side of the carriage, and extending over pulley 22 in opening 23 formed in the table, to the foot lever 24. By stepping on the foot lever the operator causes the carriage to move toward the mandrel to the point of engagement of the cutters therewith as will later be described, the carriage being returned to its starting position upon releasing the foot lever by the action of spring 25. It will be understood that the described machine, insofar as the mounting of the mandrel and cutter assemblies are concerned, is typical only, and that a machine of any suitable construction may be used whereby the cutters are moved to and from engagement with the tube and mandrel.

Each of the cutter assemblies 19 comprises a base 27 having at its inner end nearest the mandrel, a pair of integral and laterally spaced cutter carrier supports 28 and 28a. Pivotally mounted on and between the supports 28, 28a is a clevis-shaped carrier block 29 upon which is mounted the tube severing cutter disk 30, the sides 29a, 29b of the carcarier block being pivoted on the supports by means of pins 31. The disk cutter 30 is rotatably carried within block 29 on cutter shaft 32 journaled in the sides thereof.

Pivotally mounted on pins 31 at the outside of supports 28, 28a is a pair of cutter supporting blocks 33 and 33a, and a pair of rotatable disk cutters 34 and 34a, preferably of comparatively smaller diameter than the severing cutter 30, are mounted on pins 35 at the upper ends of their respective carrier blocks. The cutters 34, 34a preferably have flat inner faces 36 which are spaced from the severing cutter 30 in accordance with the length of the outer tube layer which is to be severed to accommodate the cap. It may be mentioned that whereas I have shown an assembly embodying three cutters by means of which the outer layers of the adjacent ends of two carton bodies may be severed in one operation, it may be desirable in other instances to cut only a single container to take the cap, in which case one of the side cutters would be dispensed with as will be more fully understood later. Also although the cutters are shown in their preferred mounting to be arranged side by side, the invention contemplates the mounting of the cutters in any suitable manner whereby they may be caused to cut the tube at longitudinally spaced points thereon.

As shown in Fig. 3, in the adjusted operative positions of the cutters, the severing cutter 30 projects at 38 beyond the side cutters and at the point of engagement with the tube stock 10, a distance corresponding to the thickness of the inner layer 11, so that as the cutter assembly is moved against the tube on the mandrel, the intermediate cuttter 30 cuts through the tube wall to completely sever the tube, whereas the side cutters traverse only the outer layer 12. In order to render the cutters adjustable for varying their relative positions in accordance with the thickness of the layers of different tube stock, I have provided set screws 39 and 55 threaded through the outer ends of the carrier blocks 33, 33a and 29 respectively, by means of which the cutters may be swung in their respective planes to adjusted positions about pins 31. Preferably screws 39 bear on integral portions of block 29, such as lugs 29b, and screw 55 rests on the base 27, so that having adjusted screws 39 to position the cutters for stock of a given thickness, all the cutters may be moved together to a further position of adjustment about pin 31 by means of screw 40. Thus in accordance with the thickness of stock being used, the distance which the severing cutter projects at 38 beyond the side cutters, or in other words the cutting depth of the side cutters, as well as the position of the cutters about pin 31, may be regulated as desired.

Mounted on opposite sides of the severing cutter 30 is a pair of lateral stripper blades 40 and 41, these blades being positioned normal to the plane of the cutter and confined within radial grooves 42 in the cutter by means of hook bolts 43, the inner ends 40a, 41a of the blades being retained within the hooks 43a of the bolts. Preferably the stripper blades are mounted at diametrically opposite sides of the shaft 32 in order to balance the cutter in its rotative movement. The stripper blades 40 and 41 are thus adjustable radially with respect to the cutter 30 within grooves 42, and are positioned with respect to the periphery of the cutter in accordance with the spacing at 38 of the side cutters therewith, that is, blades 40 and 41 are so adjusted that the edge of the severing cutter projects beyond their outer ends the same distance as the peripheral spacing at 38 between the severing and side cutters. Also the cutter or stripper blades preferably are of such width that these blades just clear the inner face 36 of the side cutters as the stripper blades move past them.

In the operation of the cutting mechanism, the cutter assemblies are moved into engagement with the tube 10 in the manner previously described, the tube being rotated on the mandrel during the cutting operation. The cutters are rotated by virtue of their engagement with the tube, the intermediate cutter 30 traversing the tube wall to the point of engagement with the mandrel, and the side cutters traversing only the outer layer, resulting in the severing of two annular portions of the outer layer between the cutters. During a revolution of the severing cutter the stripper blades 40, 41 each come in contact with the tube and traverse the outer layer thereof to split the severed outer layer sections between the cutters. Due to the mandrel and the carton bodies being rotated at a fairly high rate of speed, the split end portions of the outer layer on the containers are thrown off by centrifugal force. With the ends of the carton bodies cut in the manner described and as indicated at 50 in Fig. 6, a cap 51 of thickness corresponding to that of the outer tube layer 12 may be fitted on the end of the tube, so that a smooth outer surface is presented throughout the length of the carton. Although blades 40 and 41 may be termed for convenience, stripper blades, it will be understood that the action of these blades primarily is not to peel the outer severed layer 12 from the tubes, but rather to cut or split that layer so as to enable it to be thrown off by centrifugal force as the tube is rotated.

It will be understood the drawings and description are to be considered merely as illustrative of and not restrictive on the broader claims appended hereto, for various changes in design, structure and arrangement may be made without departing from the spirit and scope of said claims.

I claim:

1. A device for cutting tubes of layer formation comprising, a pair of rotatable cutter disks mounted side by side, the cutting edge of one disk projecting beyond the cutting edge of the other, a pivoted carrier for one of said disks, said carrier being adjustable to swing the cutter in its plane, a pivoted carrier for the other of said disks, and adjustable means on one of said carriers and engaging the other carrier, for varying the relative positions of the cutters 2. A device for cutting tubes of layer formation comprising, a mandrel adapted to carry a tube, a pair of rotatable cutter disks mounted side by side and movable relative to said tube into engagement therewith, the cutting edge of one disk projecting beyond the cutting edge of the other, and a lateral stripper blade mounted on the side of one of the cutters, the outer end of said stripper blade terminating short of the edge of its supporting cutter disk.

3. A device for cutting tubes of layer formation comprising, a pair of rotatable and substantially parallel cutter disks adapted to cut the tube at longitudinally spaced points thereon, and a lateral cutting blade mounted on the side of one of the cutters, the outer end of said blade terminating short of the edge of its supporting cutter disk.

4. A device for cutting tubes of layer formation comprising, a mandrel adapted to carry a tube, a pair of rotatable cutter disks mounted side by side and movable relative to said tube into engagement therewith, the cutting edge of one disk projecting beyond the cutting edge of the other, means for adjusting one of the cutters in its plane to vary the relative positions of the cutters, and a lateral stripper blade mounted on the side of one of the cutters nearest the other cutter, said blade being adjustable radially on its supporting cutter to vary its cutting depth.

5. A device for cutting tubes of layer formation comprising, a mandrel adapted to carry a tube, three rotatable cutter disks mounted side by side and movable relative to said tube into engagement therewith, the cutting edge of the intermediate disk projecting beyond the cutting edges of the side disks and a pair of lateral stripper blades mounted on the sides of said intermediate disk.

6. A device for cutting tubes of layer formation comprising, a mandrel adapted to carry a tube, three rotatable cutter disks mounted side by side and movable relative to said tube into engagement therewith, the cutting edge of the intermediate disk projecting beyond the cutting edges of the side disks, means for adjusting the relative positions of the cutters in their respective planes, and a pair of lateral stripper blades mounted on the sides of said intermediate disk.

7. In a cutter assembly of the character described, a cutter disk and a cutting blade mounted on the side of the disk and normal to the plane thereof.

8. In a cutter assembly of the character described, a cutter disk and a cutting blade mounted on the side of the disk and normal to the plane thereof, said blade being radially adjustable on the cutter disk.

9. A device for cutting tubes of layer formation, comprising a rotatable tube carrying mandrel, a tube cutter assembly embodying a pair of substantially parallel disk cutters, and means for moving said assembly to bring the cutters into engagement with the tubes, one of said cutters being adapted to traverse the tube wall to the point of engagement with the mandrel, the other cutter traversing the tube wall part way to sever the outer layer thereof, and means for severing the outer tube layer between said cutters.

10. A device for cutting tubes of layer formation, comprising a rotatable tube carrying mandrel, a tube cutter assembly embodying a pair of substantially parallel disk cutters, means for moving said assembly to bring the cutters into engagement with the tubes, one of said cutters being adapted to traverse the tube wall to the point of engagement with the mandrel, the other cutter traversing the tube wall part way to sever the outer layer thereof, means for adjusting the relative positions of said cutters to vary the cutting depth of the last mentioned cutter, and means for severing the outer tube layer between said cutters.

11. A device for cutting tubes of layer formation, comprising a rotatable tube carrying mandrel, a tube cutter assembly embodying a pair of substantially parallel disk cutters adapted to cut the tube at longitudinally spaced points thereon, means for moving said assembly to bring the cutters into engagement with the tubes, and means associated with the cutters for severing said outer tube layer therebetween.

12. A device for cutting tubes of layer formation, comprising a rotatable tube carrying mandrel, a tube cutter assembly embodying a pair of substantially parallel disk cutters adapted to cut the tube at longitudinally spaced points thereon, means for moving said assembly to bring the cutters into engagement with the tube, and a blade mounted on the side of one of the cutters and adapted to sever the outer tube layer longitudinally between the cutters.

13. A device for cutting tubes of layer formation, comprising a rotatable tube carrying mandrel, a tube cutter assembly embodying three spaced and substantially parallel disk cutters in side by side arrangement, and means for moving said assembly to bring the cutter into engagement with the side of the tube, the middle cutter being adapted to traverse the tube wall to the point of engagement with the mandrel, and the side cutters traversing the tube wall part way to sever an outer layer thereof, and a pair of blades mounted on the sides of said middle cutter and adapted to split the outer tube layer longitudinally between the cutters.

In witness that I claim the foregoing I have hereunto subscribed my name this 14th day of September, 1929.

ARCH C. HUSTON.